United States Patent [19]
Bristow, Jr.

[11] Patent Number: 5,461,806
[45] Date of Patent: Oct. 31, 1995

[54] REFLECTING ANIMAL EAR TAG

[76] Inventor: Charles E. Bristow, Jr., HC 70 Box 4529, Sahuarita, Ariz. 85629

[21] Appl. No.: 276,114

[22] Filed: Jul. 15, 1994

[51] Int. Cl.⁶ ........................................ G09F 3/00
[52] U.S. Cl. .................................... 40/301; 40/302
[58] Field of Search ..................... 40/300, 301, 302, 40/152, 644, 668

[56] References Cited

U.S. PATENT DOCUMENTS

| | | | |
|---|---|---|---|
| 495,270 | 4/1893 | Rozell | 40/301 |
| 1,282,750 | 10/1918 | Byrd | 40/301 |
| 3,388,492 | 6/1968 | Nichols, Jr. | 40/301 |
| 3,503,148 | 3/1970 | Nichols, Jr. | 40/300 |
| 3,748,696 | 7/1973 | Martin | 40/302 X |
| 4,060,922 | 12/1977 | Reggers | 40/302 |
| 4,176,482 | 12/1979 | Steckel | 40/301 |
| 4,541,402 | 9/1985 | Winters | 40/300 X |

FOREIGN PATENT DOCUMENTS 383157  10/1923  Germany ................ 40/152

Primary Examiner—Kenneth J. Dorner
Assistant Examiner—Joanne Silbermann

[57] ABSTRACT

Disclosed is a reflecting animal ear tag to protect open range cattle against being struck by a vehicle at night by improving visibility of the cattle. The reflecting ear tag also provides an ear tag which may be used in the conventional manner to identify and record information about the cattle. The tag comprises a frame-like tag holder formed of resilient plastic. The holder is reflective to the visible light normally emitted by vehicular headlamps and the like. An ear attachment clip comprises a resilient U-shaped clip body integrally attached to the top of the holder. A post having a pointed end extends inwardly from a second clip arm such that the post may engage with a hole through a first arm. The post also has a plurality of annular barbs whereby the post, and consequently the tag, is locked to the animal's ear after being driven therethrough. A removable tag insert is disposed within the frame and has surface properties to permit writing thereon.

1 Claim, 4 Drawing Sheets

REFLECTING ANIMAL EAR TAG

BACKGROUND OF THE INVENTION

1. Field of the Invention

The present invention relates to animal ear tags and more particularly pertains to a reflecting animal ear tag which may be adapted for providing a light reflecting ear tag to protect open range cattle against being struck by a vehicle at night by improving visibility of the cattle. The reflecting ear tag may also be used in the conventional manner to identify and record information about the cattle.

2. Description of the Prior Art

The use of animal ear tags is known in the prior art. More specifically, animal ear tags heretofore devised and utilized for the purpose of tagging animals are known to consist basically of familiar, expected and obvious structural configurations, notwithstanding the myriad of designs encompassed by the crowded prior art which have been developed for the fulfillment of countless objectives and requirements.

The present invention is directed to improving devices for tagging animals in a manner which is safe, secure, economical and aesthetically pleasing.

Relevant prior art patents include U.S. Pat. No. Des. 275,331 to Child which shows an animal ear tag insecticide dispenser and U.S. Pat. No. Des. 243,514 to Coulombe which shows a clip-on wheel reflector for bicycles.

The prior art also discloses an attachment device for animal ear tag as shown in U.S. Pat. No. 5,152,249 to Howe, an animal identification ear tag assembly of U.S. Pat. No. 4,958,452 to Tate, and a reflection badge in U.S. Pat. No. 4,600,269 to Rass.

While these devices fulfill their respective, particular objectives and requirements, the aforementioned patents do not disclose a reflecting animal ear tag for providing a light reflecting ear tag to protect open range cattle against being struck by a vehicle at night by improving visibility of the cattle.

In this respect, the reflecting animal ear tag according to the present invention substantially departs from the conventional concepts and designs of the prior art, and in so doing provides an apparatus primarily developed for the purpose of providing a light reflecting ear tag to protect open range cattle against being struck by a vehicle at night by improving visibility of the cattle and also providing an ear tag which may be used in the conventional manner to identify and record information about the cattle.

Therefore, it can be appreciated that there exists a continuing need for a reflecting animal ear tag which can be used for providing a light reflecting ear tag to protect open range cattle against being struck by a vehicle at night by improving visibility of the cattle and also providing an ear tag which may be used in the conventional manner to identify and record information about the cattle. In this regard, the present invention substantially fulfills this need.

As illustrated by the background art, efforts are continuously being made in an attempt to develop devices for tagging animals. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of animal ear tags now present in the prior art, the present invention provides a reflecting animal ear tag construction wherein the same can be utilized for providing a light reflecting ear tag to protect open range cattle against being struck by a vehicle at night by improving visibility of the cattle. The reflecting animal ear tag may also be used in the conventional manner to identify and record information about the cattle. As such, the general purpose of the present invention, which will be described subsequently in greater detail, is to provide an animal ear tag apparatus and method which has all the advantages of the prior art animal ear tags and none of the disadvantages.

The invention is defined by the appended claims with the specific embodiment shown in the attached drawings. For the purpose of summarizing the invention, the invention may be incorporated into a reflecting animal ear tag for providing a light reflecting ear tag to protect open range cattle against being struck by a vehicle at night by improving visibility of the cattle. The reflecting ear tag also provides an ear tag which may be used in the conventional manner to identify and record information about the cattle.

The reflecting animal ear tag comprises a rectangular frame-like tag holder formed of resilient plastic and having integral channel shaped top, bottom, and side members opening inwardly toward a rectangular open center region. The tag holder is reflective to the visible light normally emitted by vehicular headlamps and the like.

An ear attachment clip comprises a resilient U-shaped clip body integrally attached to the top of the tag holder with a rectangular connecting web extending downwardly from the arcuate portion of the clip body. A hole extends through a first clip arm proximal an upper end thereof. A post extends inwardly toward the first clip arm from a second clip arm such that the free end of the post may engage with and extend through the hole.

The post has a pointed free end with a plurality of longitudinally spaced apart annular barbs formed thereon whereby the post may driven through an ear of an animal such that the ear is sandwiched between the clip arms with the post extending through the ear and also extending through the hole of the first clip arm. Each clip arm barb has a plurality of longitudinal radially spaced apart slots formed therethrough whereby the barb will compress during the ear piercing operation and also when moving through the hole of the first clip arm then expand upon exiting the hole to lock the post and clip to the ear of the animal.

A rectangular rigid tag insert is formed of plastic and disposed within the tag frame such that the edges of the insert are engaged with the channel openings of the frame members whereby the insert is removably held within the frame. The insert is removable from the frame by deforming the resilient frame members. The insert has surface properties to permit writing thereon for recording information relating to the particular animal being tagged.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a reflecting animal ear tag for providing a light reflecting ear tag to protect open range cattle against being struck by a vehicle at night by improving visibility of the cattle.

It is another object of the present invention to provide a reflecting animal ear tag which may be easily and efficiently manufactured and marketed.

It is a further object of the present invention to provide a reflecting animal ear tag which is of a durable and reliable construction.

An even further object of the present invention is to provide a reflecting animal ear tag which is susceptible of a low cost of manufacture with regard to both materials and labor, and which accordingly is then susceptible of low prices of sale to the consuming public, thereby making such reflecting animal ear tags economically available to the buying public.

Still yet another object of the present invention is to provide a reflecting animal ear tag which provides in the apparatuses and methods of the prior art some of the advantages thereof, while simultaneously overcoming some of the disadvantages normally associated therewith.

Still yet another object of the present invention is to provide a reflecting animal ear tag that also provides an ear tag which may be used in the conventional manner to identify and record information about the cattle.

Yet another object of the present invention is to provide a reflecting animal ear tag that may be made in different colors whereby permitting color-coding of the animals.

Even still another object of the present invention is to provide a reflecting animal ear tag having compressible attachment post barbs which make the ear tag easier to apply and cause less damage to the animal than some other commonly available ear tags.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
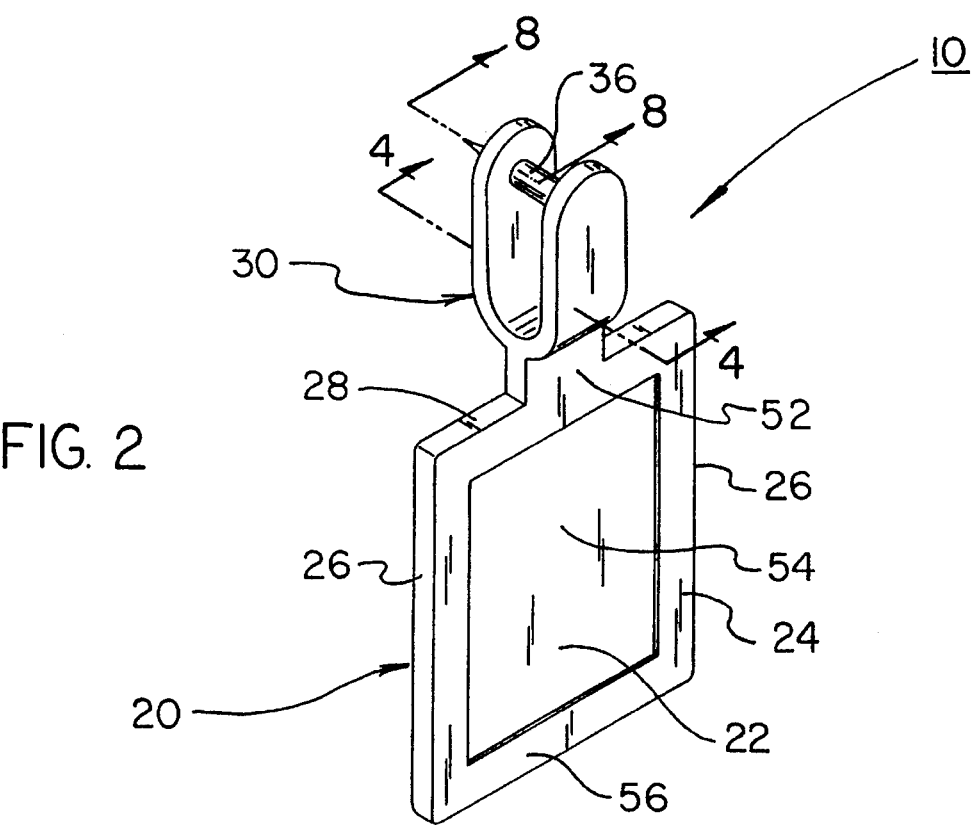
FIG. 2 is another perspective view of the device of FIG. 1.
Figure 3:
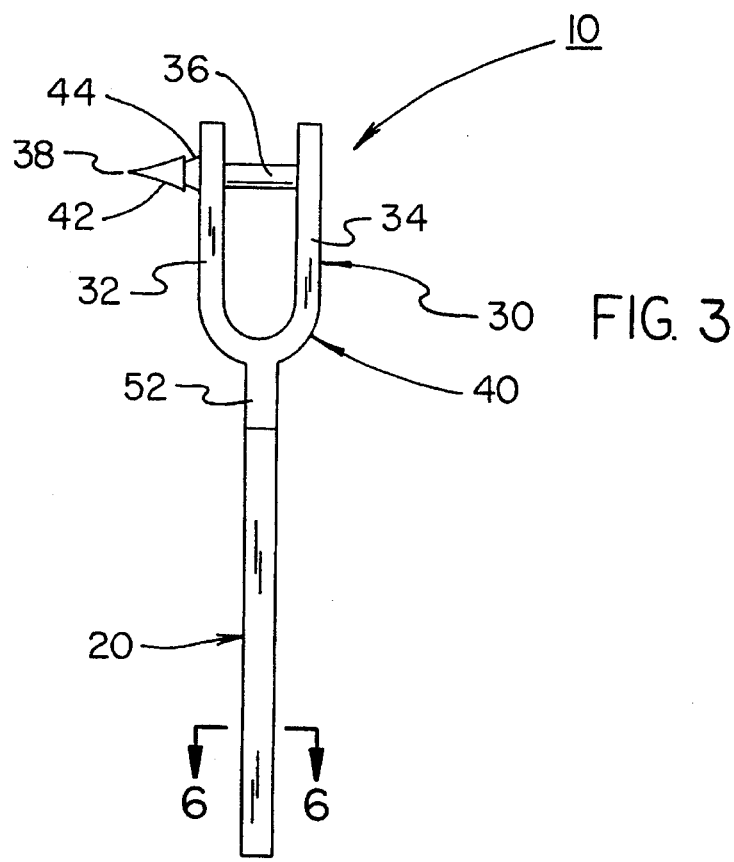
FIG. 3 is a side elevational view of the invention of FIG. 1.
Figure 4:
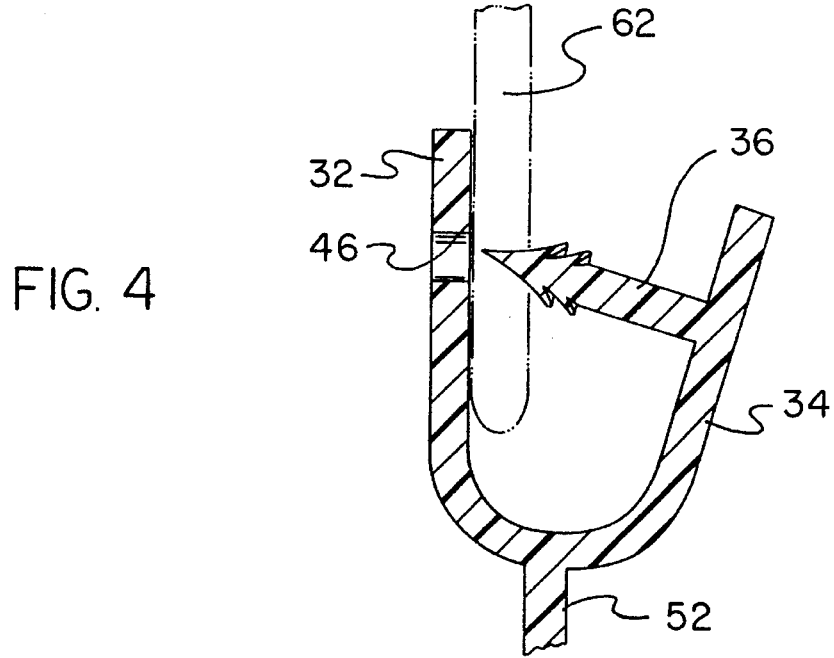
FIG. 4 is a sectional view of the invention of FIG. 2 taken along the line 4—4 and showing the manner of operation of the attachment post when piercing the animal's ear.
Figure 5:
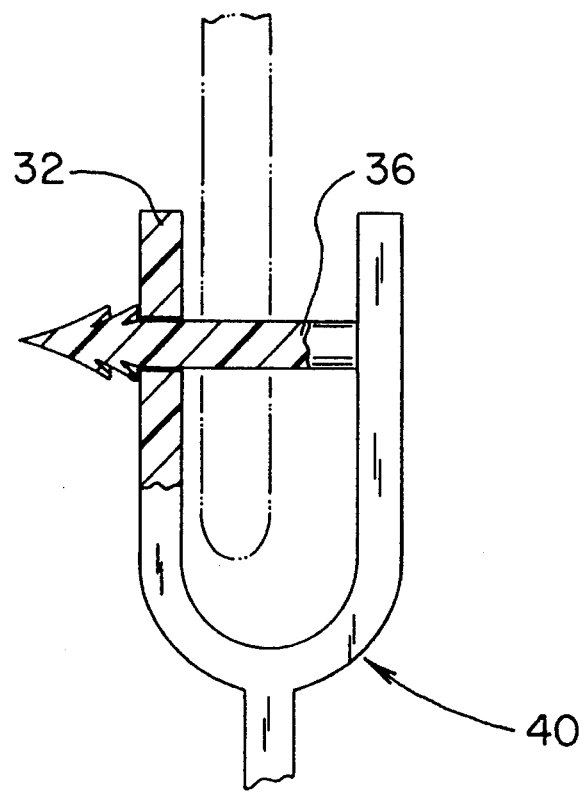
FIG. 5 is a partial side elevational partially cutaway view of the invention of FIG. 1 showing the attachment post extending fully through the animal's ear with the barbs expanded to lock the device in place.
Figure 6:
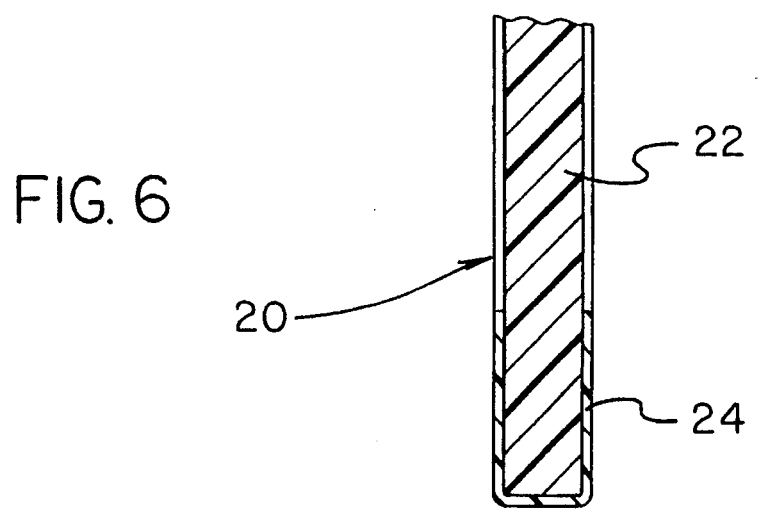
FIG. 6 is a sectional view of the invention of FIG. 3 taken along the line 6—6.
Figure 7:
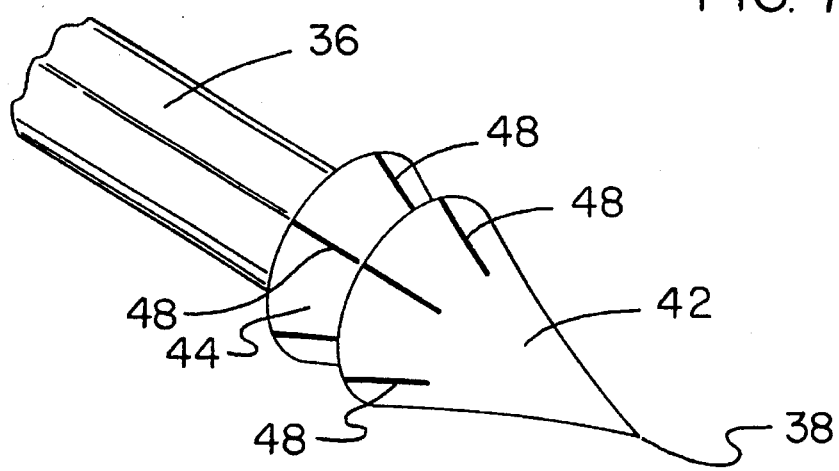
FIG. 7 is an enlarged perspective detail view of the pointed end of the attachment post and the manner of construction of the barbs.
Figure 8:
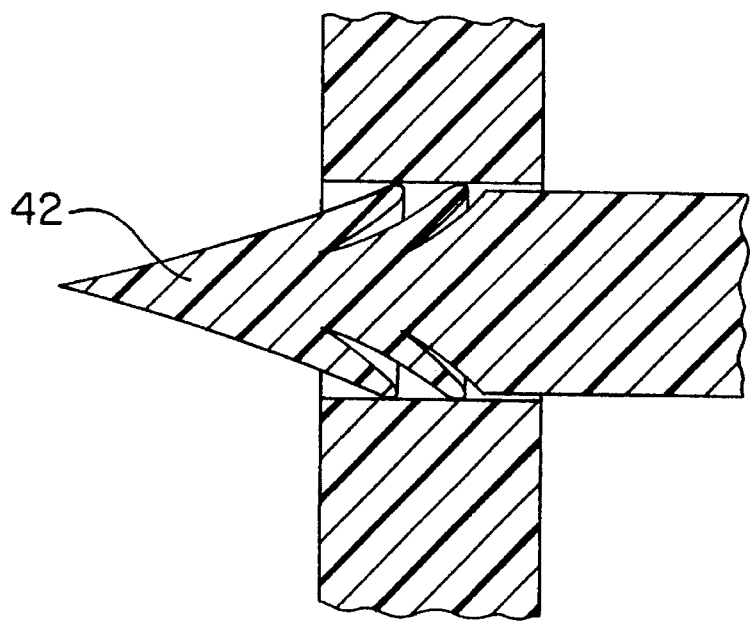
FIG. 8 is a sectional view of the invention of FIG. 2 taken along the line 8—8 and showing the barbs in their compressed state while passing through the hole of the first clip arm.

With reference now to the drawings, and in particular to FIG. 2 thereof, a reflecting animal ear tag embodying the principles and concepts of the present invention and generally designated by the reference numeral 10 will be described.

Figure 1:
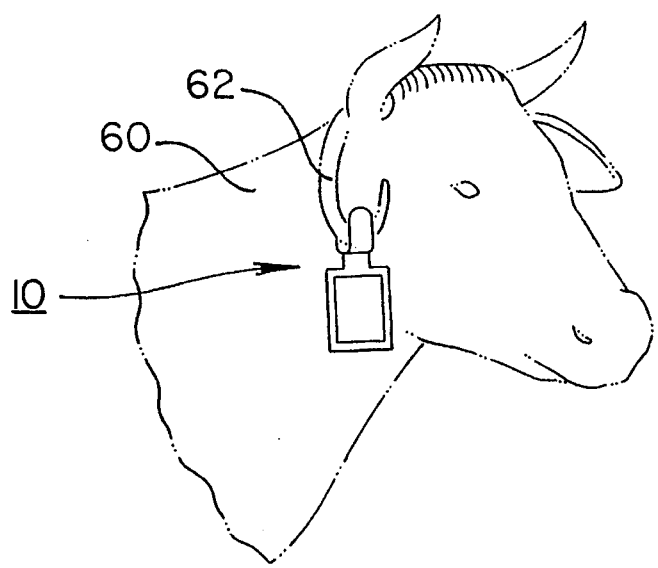
FIG. 1 is a perspective view of the preferred embodiment of the present invention reflecting animal ear tag showing its manner of use.

From an overview standpoint, the reflecting animal ear tag is adapted for use for providing a light reflecting ear tag to protect open range cattle against being struck by a vehicle at night by improving visibility of the cattle and also providing an ear tag which may be used in the conventional manner to identify and record information about the cattle. See FIG. 1.

With reference now to FIGS. 1–8 and more specifically, it will be noted that a reflecting animal ear tag 10 is shown. The reflecting ear tag 10 also provides an ear tag which may be used in the conventional manner to identify and record information about the cattle.

The reflecting animal ear tag 10 comprises a rectangular frame-like tag holder 24 formed of resilient plastic and having integral channel shaped top, bottom, and side members 28, 56, and 26 opening inwardly toward a rectangular open center region 54. The tag holder 20 is reflective to the visible light normally emitted by vehicular headlamps and the like.

An ear attachment clip 30 comprises a resilient U-shaped clip body 40 integrally attached to the top 28 of the tag holder 20 with a rectangular connecting web 52 extending downwardly from the arcuate portion of the clip body 40. A hole 46 extends through a first clip arm 32 proximal an upper end thereof. A post 36 extends inwardly toward the first clip arm 32 from a second clip arm 34 such that the free end of the post 36 may engage with and extend through the hole 46.

The post 36 has a pointed free end 38 with a pair of longitudinally spaced apart annular barbs 42 and 44 formed thereon whereby the post 36 may driven through an ear 62 of an animal 60 such that the ear 62 is sandwiched between the clip arms 32 and 34 with the post 36 extending through the ear 62 and also extending through the hole 46 of the first clip arm 32. Each clip arm barb 42 and 44 has a plurality of longitudinal radially spaced apart slots 48 formed therethrough whereby the barbs 42 and 44 will compress during the ear piercing operation and also when moving through the hole 46 of the first clip arm 32 and then expand upon exiting the hole 46 to lock the post 36 and clip 30 to the ear 62 of the animal 60.

A rectangular rigid tag insert 22 is formed of plastic and disposed within the tag frame 20 such that the edges of the insert 22 are engaged with the channel openings of the frame members 28, 56, and 26 whereby the insert 22 is removably held within the frame 20. The insert 22 is removable from the frame by deforming the resilient frame members 28, 56, and 26. The insert 22 has surface properties to permit writing thereon for recording information relating to the particular animal being tagged.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,

What is claimed is:

1. A reflecting animal ear tag for providing a light reflecting ear tag to protect open range cattle against being struck by a vehicle at night by improving visibility of the cattle and also providing an ear tag which may be used in the conventional manner to identify and record information about the cattle, the reflecting animal ear tag comprising:

a rectangular tag holder, formed as a frame of resilient plastic and having integral channel shaped top, bottom, and side members opening inwardly toward a rectangular open center region, the tag holder being reflective to the visible light normally emitted by vehicular headlamps;

an ear attachment clip comprising a resilient U-shaped clip body with an arcuate portion integrally attached to the top of the tag holder with a rectangular connecting web extending downwardly from the arcuate portion of the clip body, a hole through a first clip arm proximal an upper end thereof, a post extending inwardly toward the first clip arm from a second clip arm such that the free end of the post may engage with and extend through the hole, the post having a pointed free end with a plurality of longitudinally spaced apart annular barbs formed thereon whereby the post may be driven through an ear of an animal such that the ear is sandwiched between the clip arms with the post extending through the ear and also extending through the hole of the first clip arm, each clip arm barb having a plurality of longitudinal radially spaced apart slots formed therethrough whereby the barb will compress during the ear piercing operation and also when moving through the hole of the first clip arm and then expand upon exiting the hole to lock the post and clip to the ear of the animal; and a rectangular rigid tag insert formed of plastic and disposed within the tag frame such that the edges of the insert are engaged with the channel openings of the frame members whereby the insert is removably held within the frame, the insert being removable from the frame by deforming the resilient frame members, the insert having surface properties to permit writing thereon for recording information relating to the particular animal being tagged;

inserts having a variety of surface colors whereby cattle may be color-coded; and frames having a variety of colors whereby cattle may be color-coded.

\* \* \* \* \*